United States Patent [19]

Bloomer et al.

[11] 4,100,066
[45] Jul. 11, 1978

[54] TREATING PAINT WASTE SOLIDS

[75] Inventors: Ivan Bloomer; Ronald William Young, both of London, England

[73] Assignee: Carrier Drysys Limited, London, England

[21] Appl. No.: 683,424

[22] Filed: May 5, 1976

[30] Foreign Application Priority Data

May 7, 1975 [GB] United Kingdom ............... 19240/75

[51] Int. Cl.² ................................................ C02B 1/00
[52] U.S. Cl. .................................. 210/44; 210/73 R;
210/83; 210/86; 210/104; 210/112; 210/115;
210/167; 210/195 R; 210/221 R; 210/221 P;
210/258; 210/536
[58] Field of Search ...................... 210/44, 83, 86, 90,
210/104, 112, 115, 195 R, 197, 221 P, 221 M,
536, 258, 167, 221 R

[56] References Cited

U.S. PATENT DOCUMENTS

| 2,770,365 | 11/1956 | Welsch | 210/221 P X |
| 2,805,844 | 9/1957 | McMaster | 210/167 X |
| 2,981,525 | 4/1961 | Umbricht | 210/167 X |
| 3,341,016 | 9/1967 | Paasche | 210/167 X |
| 3,705,650 | 12/1972 | Gotte | 210/221 M |
| 3,764,013 | 10/1973 | Eisenmann | 210/44 X |
| 3,772,190 | 11/1973 | Eisenmann | 210/44 |
| 3,844,945 | 10/1974 | Ciaffone | 210/104 X |

FOREIGN PATENT DOCUMENTS 2,357,461  12/1974  Fed. Rep. of Germany ... 210/221 P

Primary Examiner—Morris O. Wolk
Assistant Examiner—Arnold Turk
Attorney, Agent, or Firm—Burns, Doane, Swecker & Mathis

[57] ABSTRACT

Waste paint which is contained in an aqueous medium which flows from a paint spraying booth is collected by apparatus which comprises a vessel which is located outside the booth and has at the lower portion thereof an inlet for paint laden aqueous medium or for scum from the surface of aqueous medium in a flotation tank, and an outlet at the lower portion for the passage of aqueous medium from the vessel. A paint solids outlet is associated with the upper portion of the vessel and fluid pressure is applied to a raft of paint solids accumulated in the vessel to cause the flow of paint solids from the vessel into a container.

29 Claims, 4 Drawing Figures

TREATING PAINT WASTE SOLIDS

BACKGROUND OF THE INVENTION

1. Field of the Invention

This invention relates to the treating of paint waste solids and in particular to a method of and apparatus for collecting and disposing of waste paint solids contained in an aqueous medium used to wash the paint from the extracted atmosphere of a paint spraying booth.

2. Description of the Prior Art

Conventional methods used for the recovery, on an automatic basis, of waste paint solids from high production rate spray booths involve the use of treatment tanks of large capacity in which the waste paint solids are constrained to agglomerate as a raft on the surface of the liquid medium, or to sink and accumulate as a sludge on the bottom of the tank. Typically a tank for use with a spray booth having a length of 100 ft could have a capacity of 1500 cu.ft and dimensions of 25 ft × 15 ft × 4 ft. Such a tank together with the necessary mechanical scumming or dredging mechanisms represents a high initial cost and the use of considerable space.

Smaller systems rely upon manual removal of accumulated paint from the tank, this being an unpleasant and time consuming operation.

It is an object of the invention to provide a method of and apparatus for the collecting or accumulation and disposal of waste paint solids contained in an aqueous medium used to wash the paint from the extracted atmosphere of a paint spraying booth which reduces considerably the space required for the apparatus and avoids the need for mechanical scumming or dredging mechanisms.

SUMMARY

According to the invention a method of collecting and disposing of waste paint solids contained in an aqueous medium which flows from a paint spraying booth into a container located beneath the booth or contained in scum on the surface of aqueous medium delivered from the water container into a flotation tank outside the booth comprises the steps of:

flowing paint laden aqueous medium from the water container or scum into the lower portion of a vessel which has sides, a top and a bottom and is located outside the booth, retaining the aqueous medium in the vessel for a residence time sufficient to permit paint solids to accumulate as a raft on the surface of the aqueous medium in the vessel, and causing the accumulated paint solids to flow from an outlet at the upper portion of the vessel into a container by applying fluid pressure to the raft.

Further according to the invention there is provided apparatus for collecting and disposing of waste paint solids contained in an aqueous medium which flows from a paint spraying booth into a water container located beneath the booth or contained in scum on the surface of aqueous medium delivered from the water container into a flotation tank outside the booth, said apparatus comprising a vessel located outside the booth and having sides, a top and a bottom, an inlet at the lower portion of the vessel for paint laden aqueous medium or for scum and aqueous medium from the flotation tank, an outlet at the lower portion of the vessel for the passage of aqueous medium from the vessel, a paint solids outlet associated with the upper portion of the vessel, means operable to retain the aqueous medium in the vessel for a residence time sufficient to permit paint solids to accumulate as a raft in the surface of the aqueous medium in the vessel, and means operable to apply fluid pressure to the raft thereby to cause the flow of paint solids from the paint solids outlet into a container.

DESCRIPTION OF THE PREFERRED EMBODIMENTS

Figure 1:
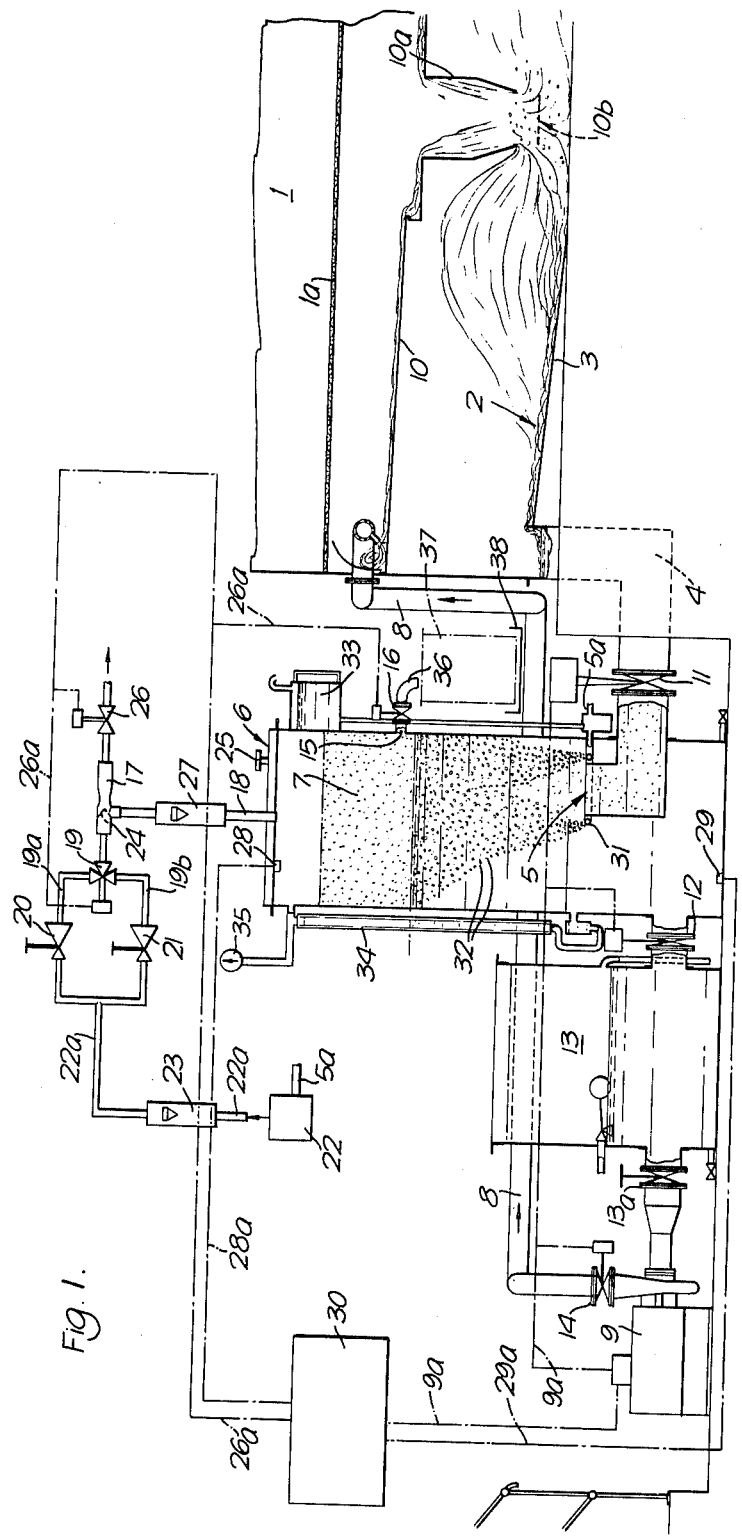
FIG. 1 digrammatically illustrates one embodiment of the invention.

In the drawings like references indicate like or similar parts.

The invention is applicable to any kind of paint spraying booth washed by an aqueous medium, usually water, but as shown in FIG. 1, the paint spraying booth 1 is considered as being constructed and arranged to operate as described in British Patent Specification No. 1,399,805 and includes tubes 10a which depend from guide plates 10 beneath the floor 1a of the booth, and baffles 10b, the tubes 10a and baffles 10b operating as described in the said Specification. The paint-laden water 2 which flows from a water container 3 beneath the booth 1 into a pipe 4 the outlet 5 from which is located within and is directed upwards towards the upper portion of a vessel 6 which has sides, a top, and a bottom and in which waste paint solids 7 separate out of the water and are accumulated as a raft on the surface of water in the upper portion of the vessel.

The vessel 6, which is preferably of rectangular cross-section, has a bleed, or air release valve, 25 in the top thereof and is included in a circulating system arranged to circulate the water through the spray booth, the system including a pipe 8 through which the water is pumped by a circulating pump 9 to flow over guide plates 10 beneath the floor 1a of the spray booth into the water container 3, and solenoid-controlled isolating valves 11, 12 which are associated with the vessel 6 and the purpose of which is described below. The velocity of water entering and leaving the vessel 6 is controlled by a pre-set solenoid-controlled flow control valve 14 to provide in the vessel 6 a residence time for the water sufficient for paint particles to separate from the water and to accumulate on the surface of the water in the vessel. The volume of water required in the vessel 6 can be determined by a water level control tank 13 and the valve 12. A valve 13a interposed in the circulating system between the vessel 6 and the circulating pump 9 controls the flow of water to the pump. The flow of water around the circulating system can be arrested by stopping operation of the circulating pump 9 while accumulated paint 7 is being extruded through a normally closed outlet 15 connected to a solenoid-controlled valve 16.

Control means are provided to maintain a negative air pressure in the upper portion of the vessel 6 during accumulation of paint in the vessel and to apply a positive air pressure to the accumulated paint while the isolating valves 11 and 12 are closed and the outlet 15 is open. The control means comprises an eductor 17 connected with the top of the vessel 6 through a pipe 18 and through a solenoid-controlled three-way valve 19 which is connected by pipes 19a, 19b with a pair 20, 21 of pressure regulators each connected by a pipe 22a with a source 22 of pressurized air. The regulators 20, 21 are preset one to the pressure, for example 25 pounds per square inch, at which the eductor 17 is arranged to evacuate the vessel 6, and the other to the pressure, for example 5 pounds per square inch, at which paint is extruded from the vessel 6. If desired, a flow meter 23 may be provided in the pipe 22a between the source 22 and the pressure regulators 20, 21. The eductor 17 which is a form of venturi tube the restriction 24 of which is in communication with the pipe 18, is also associated with a bleed 25 and a solenoid-controlled valve 26 which controls the pressurizing sequence of the vessel 6. If desired, a flow meter 27 can be included in the pipe 18 between the eductor 17 and the top of the vessel 6.

If desired, sonic detectors 28, 29 may be spaced apart lengthwise of the vessel 6 to detect the level of accumulated paint, the detectors being connected, via lines 28a, 29a, through an electric/electronic control panel 30 and line 9a with the pump 9, the valve 16 associated with the outlet 15, with the valves 19, 26 of the control means, and the isolating valves 11, 12. The valves 19, 26, are connected with the control panel 30 via line 26a, and the valves 11, 12, and 14 are connected with the control panel via line 9a which includes the pump 9. The valve 16 is connected with the control panel via the line 26a.

To assist the accumulation of paint of unusually small particle size, or high specific gravity, there is provided around the outlet 5 of the pipe 4 an annular perforated tube 31 which is connected by a pipe 5a with the source 22 of pressurized air and admits into the vessel 6 a finely dispersed stream of air bubbles 32 which inhibit undue local turbulence loss and assist solids flotation from the perimeter regions of the tube 31. Further to assist the flotation and accumulation of the paint particles, oil from a reservoir 33 may be incorporated in the pressurized air passing into the tube 31. The oil introduced into the vessel 6 also serves to lubricate the walls of the vessel so that during extrusion the paint is prevented from adhering to the walls when under pressure.

A water-level sight tube 34 and a pressure gauge 35 may be associated with the vessel 6.

If the expected quantity of waste paint from a booth is large the paint-laden water from the container 3 may be delivered through two pipes 4 into two vessels 6 to avoid the provision of a single vessel 6 of undue size. Further, in order to reduce the time needed for removing accumulated paint from a vessel the latter can be provided with a plurality, for example three, outlets 15 each having a valve 16. By graded sizing of the valves 16 the depth of residual paint in the vessel 6 can be minimal.

The operation of the apparatus is as follows:

Preparatory to the commencement of paint spraying in the booth 1 the pump 9 is started, isolating valves 11, 12 are opened, and a volume flow rate of water, determined by the pre-set valve 14, through the circulation system is established. Compressed air is applied to the eductor through the valve 20 to evacuate the vessel 6 to the pre-set depression. Spray booth air extraction fans, not shown, are switched on and displaced water from the container 3 is accommodated in the vessel 6 to provide the required volume thereof in the vessel. The spray booth is now ready for paint spraying operations to be carried out in the usual manner and during such operations paint accumulates on the top of the water in the vessel 6 with a lowering of the level of the water in the vessel.

On completion of the paint spraying operations the circulation of water is continued and the booth air extraction fans continue to operate for a predetermined period, for example about one hour, following which the booth air extraction fans, not shown, are switched off and the isolation valves 11,12 are closed thus isolating the accumulated paint and the residual water in the vessel 6, and the pump 9 is switched off.

The valve 26 then operates to throttle the pressurized air exit from the eductor 17 and the three-way valve 19 changes over to admit pressurized air from the regulator 21 thereby to provide a positive pressure in the vessel 6 above the accumulated paint. The valve 16 is then opened and the accumulated paint is extruded through the outlet 15 and is delivered through a pipe 36 into a porous sack or bag 37 from which residual water can drain into a drain tray 38. Alternatively, the extrudate may be delivered into a wheeled truck. Extrusion continues until a predetermined minimum of waste paint remains in the vessel 6, this being determined by the size of the valve 16.

When the extruding operation has been completed the three-way valve 19 changes over so that pressurized air from regulator 20 again passes to the eductor 17 and the valve 16 is closed. When the valves 11, 12 and 14 are re-opened the apparatus is ready to re-commence operation during the next paint spraying period.

If non-porous bags are used, the extruded paint water collected in the bags may be permitted to overflow from the tops thereof into the drain tray.

If desired, instead of delivering the extruded paint directly into the bags it may be caused to pass through a micro-wave channel in which residual water and solvents are driven off to present a drier material for collection. Alternatively, some drying of the extrudate prior to collection may be effected by subjecting the extrudate to a stream of hot air.

Figure 2:
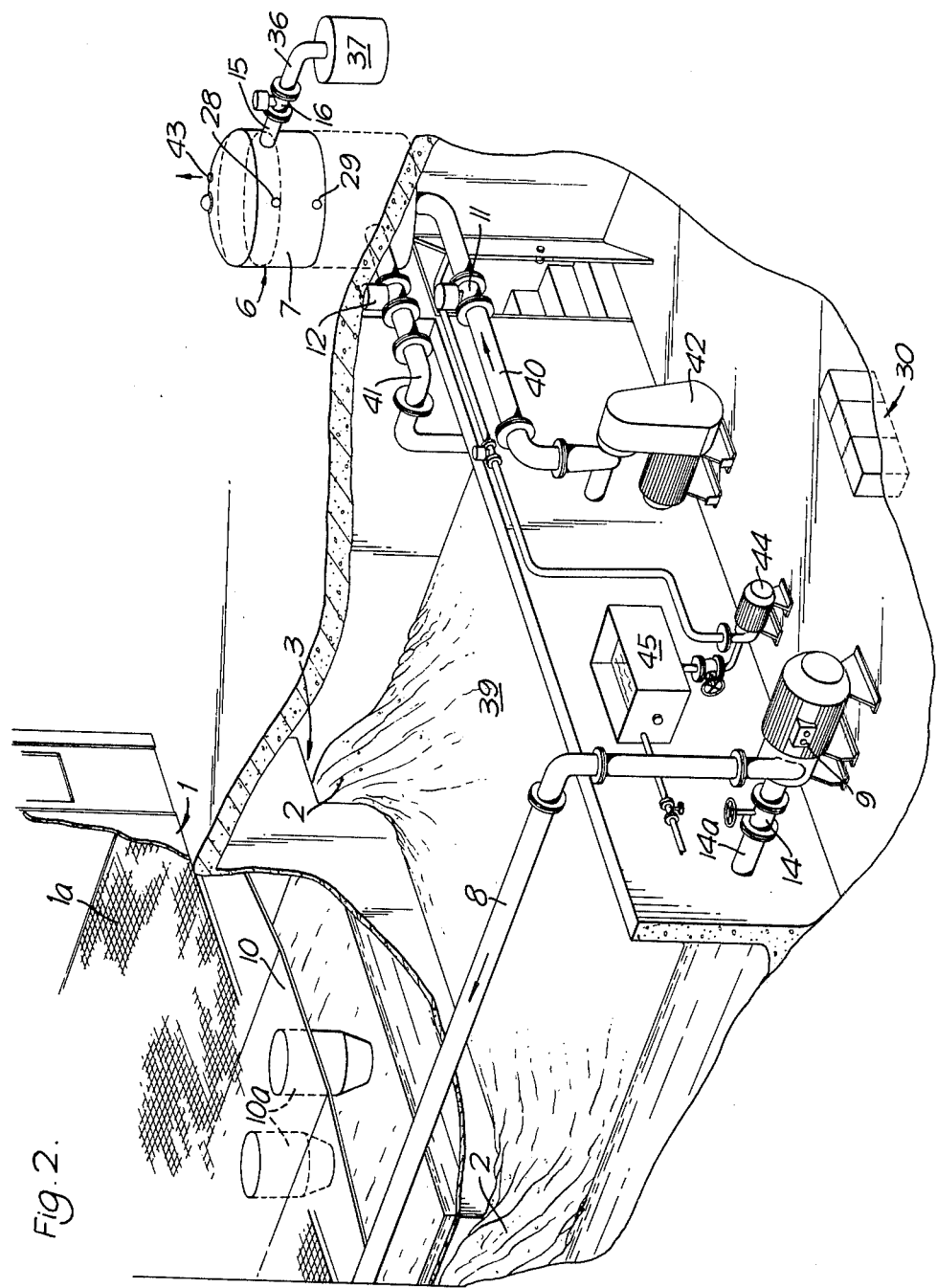
FIG. 2 is an isometric view diagrammatically illustrating a second embodiment.

FIG. 2 illustrates an alternative embodiment in which the paint-laden water 2 is delivered from the water container 3 into a flotation tank 39 which is outside the booth that is included in the circulating system, and which can have a capacity and dimensions much less than that of a treatment tank as referred to above. In this embodiment the circulating system includes a pipe 14a which connects the lower portion of the tank 39 to the pump 9.

The lower part of the vessel 6 is connected with the flotation tank 39 by an input pipe 40 and a water return pipe 41. The pipes 40, 41 respectively include the isolating valves 11, 12. A scum-removal pump 42 connects the input pipe 40 to the flotation tank 39 and is operable during painting operations to remove floating paint solids as scum from the surface of water in the flotation tank and to deliver the scum to the lower portion of the vessel 6, water admitted to the vessel 6 being returned to tank 39 through the return pipe 41. At this time an air release valve 43 at the top of the vessel 6 is open.

When accumulated solids are to be extruded from the vessel 6 the isolating valves 11, 12 are closed, as is the air release valve 43, and the valve 16 is opened. Operation of the scum-removal pump 42 is stopped and a pressurizing pump 44 connected to a clean water containing tank 45 is started up thus applying hydraulic pressure to the lower interior portion of the vessel 6.

The accumulated solids are thus trapped below an air cushion in the upper portion of the vessel 6 and the pressurized water admitted into the lower portion of the vessel 6 and are extruded through the outlet 15. With this embodiment the circulating pump 9 can continue to operate while the vessel 6 is isolated and accumulated solids are being extruded therefrom.

When extrusion is completed valves 16 and 43 are closed, isolating valves 11 and 12 are opened, operation of pump 44 is stopped and pump 42 is restarted and painting operations in the booth can be resumed. Operation of the pumps 42, 44 and the valves 11, 12 and 16 is controlled by a control panel 30.

Figure 3:
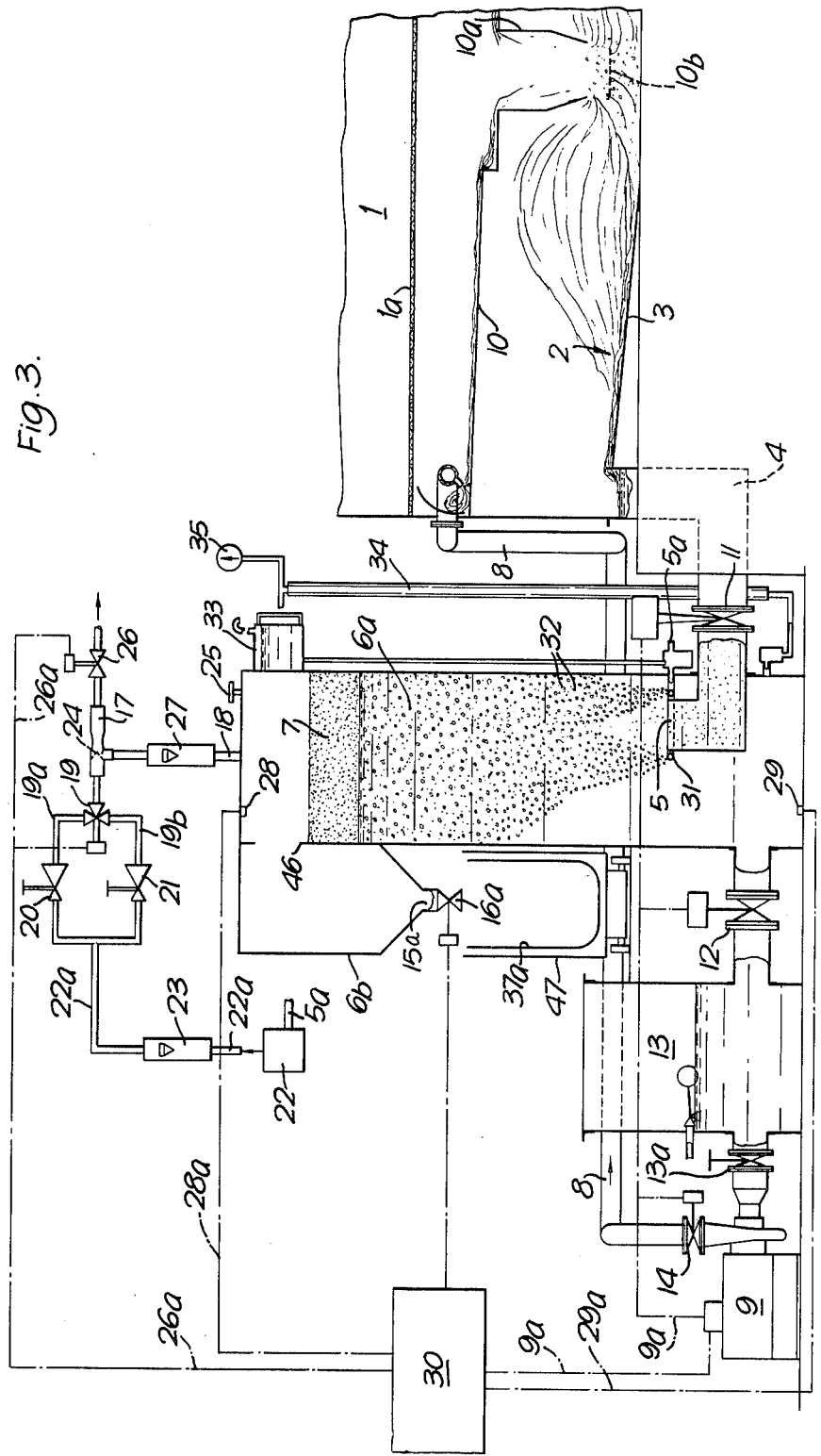
FIG. 3 illustrates a modified embodiment of FIG. 1.

FIG. 3 illustrates a modified embodiment of the apparatus shown in FIG. 1, the modified apparatus being designed to promote a more rapid removal of accumulated paint solids. The apparatus of FIG. 3 is the same as that described with reference to FIG. 1 except for the modifications now to be described.

In the embodiment of FIG. 3 the vessel 6 comprises two side-by-side compartments of which the first compartment 6a is arranged to accumulate separated paint solids and the second compartment 6b includes an outlet 15a connected to a solenoid-controlled valve 16a. Communication between the compartments 6a, 6b is effected over a weir 46.

Operation of this embodiment is as follows:

Preparatory to the commencement of paint spraying in the booth 1 the pump 9 is started, isolating valves 11 and 12 are opened, and a volume flow rate of water, determined by the pre-set valve 14, through the system is established. Compressed air is applied to the eductor 17 through the valve 20 to evacuate the compartments 6a, 6b to the pre-set depression. Spray booth air extractor fans, not shown, are switched on and displaced water from the container 3 is accommodated in the first compartment 6a to provide the required volume thereof in the compartment. The spray booth is now ready for paint spraying operations to be carried out in the usual manner and during such operations paint accumulates on the top of the water in the first compartment 6a and due to depression created in the compartments 6a, 6b the level of the water rises until there is a continuous flow of accumulated paint solids over the weir 46 into the second compartment 6b.

When it is desired to remove the paint solids from the second enclosure the isolation valves 11, 12 are closed and the pump 9 is switched off.

The valve 26 then operates to throttle the pressurized air exit from the eductor 17 and the three-way valve 19 changes over to admit pressurized air from the regulator 21 thereby to provide a positive pressure in the upper portions of the compartments 6a, 6b. The valve 16a is then opened and the accumulated paint is extruded into a porous container 37a disposed in a truck 47.

When the compartment 6b has been emptied the three-way valve 19 changes over so that pressurized air from regulator 20 again passes to the eductor 17 and the valve 16a is closed. When the valves 11, 12 and 14 are re-opened the apparatus is ready to re-commence operation during the next paint spraying period.

Figure 4:
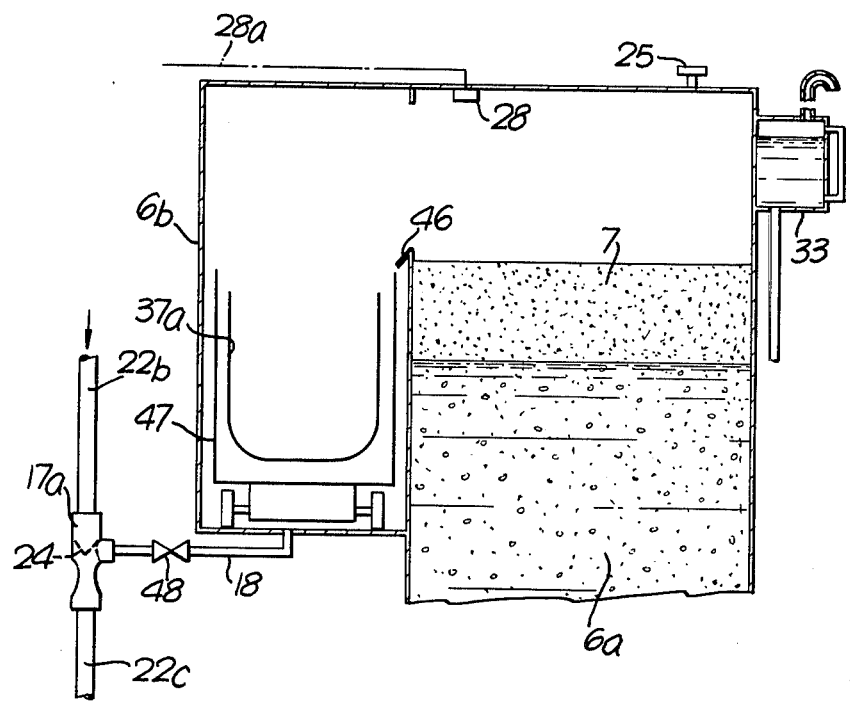
FIG. 4 illustrates a modification to FIG. 3.

FIG. 4 illustrates a modification to the apparatus shown in FIG. 3 and differs therefrom as described below.

In the embodiment of FIG. 4 the second enclosure 6b is not provided with a valve 16a. In this embodiment the truck 47 housing a container 37a is so positioned that the upper end of the container 37a is in close proximity with the top of the weir 46 so that paint solids flowing over the weir from the first enclosure 6a is delivered directly into the container. Also in this embodiment the compartments 6a and 6b are evacuated to the desired level of negative pressure by an hydraulically powered eductor 17a following appropriate setting of the control bleed 25. Water is pumped to the eductor 17a by the pump 9 through a pipe 22b the outlet from the eductor being connected by a pipe 22c with the water level control tank 13. Drainage from compartment 6b is controlled by a valve 48.

When this embodiment is in operation the isolating valves 11, 12 are open and there is created in the second compartment 6b and in the upper portion of the first compartment 6a a negative air pressure the difference between which and atmospheric pressure causes the continuous flow of accumulated paint solids over the weir 46 into the container 37a. When the container 37a is filled to the desired extent the pressure in the compartments 6a, 6b is restored to atmospheric pressure and the container 37a is removed from the second compartment through a door not shown.

With the embodiment of FIG. 4 it is necessary to shut down the apparatus only while the truck 47 and loaded container are being removed from the second enclosure 6b and replaced by a truck with an empty container.

It has been found that the container 37, FIGS. 1 and 2, or 37a, FIGS. 3 and 4, is preferably provided with perforations of eliptical shape and dimensions of about 300 microns by 100 microns.

We claim:

1. A method of collecting and disposing of waste paint solids contained in an aqueous medium which flows from a paint spray booth into a water container located beneath the booth, the method comprising the steps of:
    flowing paint laden aqueous medium from the water container into the lower portion of a vessel which has sides, a top and a bottom and which is located outside the booth;
    retaining the aqueous medium in the vessel for a residence time sufficient to permit paint solids to accumulate as a raft on the surface of the aqueous medium in the vessel; and
    by applying fluid pressure to the raft causing the accumulated paint solids to flow from an outlet at an upper portion of the vessel into a container.

2. A method according to claim 1, wherein said step of flowing paint laden aqueous medium includes flowing paint laden aqueous medium from the water container to a flotation tank, allowing the paint to form a scum on a surface of the aqueous medium in the tank, and then flowing the paint scum and aqueous medium from the flotation tank to the lower portion of the vessel.

3. The method according to claim 1, wherein the accumulated paint solids are extruded from the vessel into the container through at least one valve controlled outlet from the vessel.

4. The method according to claim 3 including the steps of:
    locating the vessel in a circulating system for the aqueous medium;
    associating isolating valves with the vessel respectively to control the admission of paint solids laden medium to the vessel and to permit the passage of aqueous medium out of the vessel;

with said valve controlled outlet closed and the isolating valves open, controlling the velocity of the aqueous medium to provide said residence time for the aqueous medium in the vessel;

while said valve controlled outlet is closed and the isolating valves are open, creating a negative air pressure in the upper portion of the vessel; and closing the isolating valves, opening said valve controlled outlet, and said applying fluid pressure to said raft including creating in the upper portion of the vessel a positive air pressure which is applied to the top of the raft to extrude accumulated paint solids through said valve controlled outlet into the container.

5. The method according to claim 3 including the steps of:

prior to flowing paint laden aqueous medium into the vessel delivering the paint laden aqueous medium into a flotation tank included in a circulating system for the aqueous medium;

effecting communication between the flotation tank and the vessel through isolating valves;

with said valve controlled outlet closed and the isolating valves open, pumping floating scum and aqueous medium from the flotation tank into the lower portion of the vessel and creating a cushion of air in the upper portion of the vessel;

closing the isolating valves and opening said valve controlled outlet, and extruding the paint solids accumulated in the vessel through said valve controlled outlet into the container by hydraulic pressure applied to the bottom of the raft from the lower portion of the vessel.

6. The method according to claim 3 including the steps of:

locating the vessel in a circulating system for the aqueous medium forming the vessel as two side-by-side compartments in the first of which is formed the raft of accumulated paint solids, and the second of which includes said valve controlled outlet arranged to receive accumulated paint solids by the passage thereof over a weir common to the first and second comparts;

associating isolating valves with the first compartment respectively to control the admission to the first compartment of paint solids laden aqueous medium and to permit the passage of aqueous medium out of the first compartment;

with said valve controlled outlet closed and the isolating valves open, controlling the velocity of the aqueous medium to provide in the first compartment said residence time for the aqueous medium in the first compartment;

creating in the second compartment and in the upper portion of the first compartment a negative air pressure, the difference between which negative air pressure and atmospheric pressure causes the flow of accumulated paint solids over the weir to transfer the raft into the second compartment; and closing the isolating valves, opening the valve controlled outlet, and creating in the upper portion of the vessel a positive air pressure which is applied to the transferred raft to extrude paint solids through the outlet into the container.

7. Apparatus for collecting and disposing of waste paint solids contained in an aqueous medium which flows from a paint spraying booth into a water container located beneath the booth said apparatus comprising:

a vessel located outside a paint spray booth and having sides, a top and a bottom;

an inlet at a lower portion of the vessel for receiving paint laden aqueous medium from a water container located below the paint spray booth;

an outlet at a lower portion of the vessel for the passage of aqueous medium from the vessel;

a paint solids outlet associated with an upper portion of the vessel;

means operable to retain the aqueous medium in the vessel for a residence time sufficient to permit paint solids to accumulate as a raft on the surface of the aqueous medium in the vessel; and means operable to apply fluid pressure to the raft thereby to cause the flow of paint solids from the paint solids outlet into a container.

8. Apparatus according to claim 7 wherein the inlet at a lower portion of the vessel is connected to an outlet of a flotation tank which tank receives paint laden aqueous medium from a water container so that paint forms a scum on a surface of aqueous medium in the flotation tank, said vessel receiving paint scum and aqueous medium from the outlet of the flotation tank.

9. Apparatus according to claim 8 wherein the lower portion of the vessel is connected with the flotation tank by an input pipe and an aqueous medium return pipe, wherein said pipes each include an isolating valve, wherein a scum-removal pump connects the input pipe to the flotation tank and is operable to remove scum and aqueous medium from the flotation tank and to deliver the scum and aqueous medium into the lower part of the vessel, and wherein a pressurizing pump is connected with a clean aqueous medium containing tank and with the lower portion of the vessel and is operable to apply hydraulic pressure to the lower interior portion of the vessel thereby to extrude paint solids accumulated in the vessel through the paint solids outlet.

10. Apparatus according to claim 7 wherein the means operable to retain the aqueous medium in the vessel comprises isolating valves associated one with the inlet and one with the outlet of the lower portion of the vessel, said valves being operable respectively to control the admission of paint solids laden aqueous medium to the vessel and to control the velocity of aqueous medium entering and leaving the vessel so as to provide in the vessel said residence time for the aqueous medium, wherein an outlet control valve is associated with the paint solids outlet and arranged to be closed when the isolating valves are open and open when the isolating valves are closed, and wherein said means for applying fluid pressure includes control means operable to maintain a negative air pressure in the upper portion of the vessel during accumulation of paint solids in the vessel and to apply a positive air pressure to the upper interior portion of the vessel while said paint solids outlet control valve is open thereby to extrude paint solids accumulated in the vessel through the paint solids outlet control valve.

11. Apparatus according to claim 10, wherein the control means comprises an eductor connected with the vessel and through a solenoid controlled three-way valve with a pair of pressure regulators each connectable with a source of pressurized air, said regulators being pre-set one to the pressure at which the eductor is arranged to evacuate the vessel and the other to the positive pressure at which paint solids are extruded from the vessel.

12. Apparatus according to claim 10, including a level control tank having an inlet connected to the isolating valve associated with the outlet from the lower portion of the vessel and an outlet, a pipe connected to the isolating valve associated with the inlet at the lower portion of the vessel and the outlet from which pipe is directed upwards towards the upper portion of the vessel, and a pump to circulate aqueous medium from said level control tank outlet to a booth.

13. Apparatus according to claim 12, including sonic detectors spaced apart lengthwise of the vessel to detect the level of solids accumulated in the vessel, said detectors being connected with the circulating pump, with a solenoid of said controlled solids outlet valve, with said control means, and with said isolating valves.

14. Apparatus according to claim 12, including around the outlet end of the pipe an annular perforated tube which is connectable with a source of pressurized air and is arranged to admit into the vessel a stream of finely dispersed air bubbles to inhibit undue turbulence loss and to assist paint solids flotation from the perimeter regions of the tube.

15. Apparatus according to claim 14, including a reservoir connected to said tube and arranged to contain oil for incorporation in said stream.

16. Apparatus according to claim 10, wherein the vessel comprises two side-by-side compartments of which the first has said isolating valves associated therewith and is arranged to accumulate separated paint solids, the second includes the valve controlled paint solids outlet, and communication between the compartments is effected over a weir.

17. Apparatus according to claim 16, wherein the control means comprises an eductor connected with the vessel and through a solenoid controlled three-way valve with a pair of pressure regulators each connectable with a source of pressurized air, said regulators being pre-set one to the pressure at which the eductor is arranged to evacuate the vessel and the other to the positive pressure at which paint solids are extruded from the vessel.

18. Apparatus according to claim 16 including a level control tank having an inlet connected to the isolating valve associated with the outlet from the lower portion of the vessel and an outlet, a pipe connected to the isolating valve associated with the inlet at the lower portion of the vessel and the outlet from which pipe is directed upwards towards the upper portion of the vessel, and a pump to circulate aqueous medium from said level control tank outlet to a booth.

19. Apparatus according to claim 18, including sonic detectors spaced apart lengthwise of the vessel to detect the level of solids accumulated in the vessel, said detectors being connected with the circulating pump, with a solenoid of said controlled solids outlet valve, with said control means, and with said isolating valves.

20. Apparatus according to claim 18, including around the outlet end of the pipe an annular perforated tube which is connectable with a source of pressurized air and is arranged to admit into the vessel a stream of finely dispersed air bubbles to inhibit undue turbulence loss and to assist paint solids flotation from the perimeter regions of the tube.

21. Apparatus according to claim 20, including a reservoir connected to said tube and arranged to contain oil for incorporation in said stream.

22. A method of collecting and disposing of waste paint solids contained in an aqueous medium which flows from a paint spray booth into a water container located beneath the booth, the method comprising the steps of:
flowing paint laden aqueous medium from the water container into the lower portion of a vessel which has sides, a top, a bottom and first and second side-by-side compartments, wherein the first compartment receives the paint laden aqueous medium and accumulates the paint solids;
locating a waste container in the second compartment with a mouth of the waste container in close proximity with an opening common to the first and second compartments;
retaining the aqueous medium in the first compartment for a residence time sufficient to permit paint solids to accumulate as a raft on the surface of the aqueous medium in the first compartment; and
applying fluid pressure to the raft causing the accumulated paint solids to flow through the opening and into the waste container.

23. The method according to claim 22 including the steps of:
locating the waste container in the second compartment with the mouth of the waste container in close proximity with the top of a weir common to the first and second compartments, said weir forming said opening;
associating isolating valves with the first compartment respectively to control the admission to the first compartment of paint solids laden aqueous medium and to permit the passage of aqueous medium out of the first compartment;
opening the isolating valves and creating in the second compartment and in the upper portion of the first compartment a negative air pressure, the difference between which negative air pressure and atmospheric pressure causes the flow of accumulated paint solids over the weir into the waste container; and
closing the isolating valves, restoring the pressure in the first and second compartments to atmospheric pressure, and removing the waste container from the second compartment.

24. Apparatus for collecting and disposing of waste paint solids contained in an aqueous medium which flows from a paint spraying booth into a water container located beneath the booth, said apparatus comprising:
a vessel located outside a paint spray booth and having sides, a top, a bottom, and first and second side-by-side compartments, said first compartment arranged to accumulate paint solids and the second compartment carrying a waste container whose mouth is located in close proximity with an opening common to the first and second compartments;
an inlet situated at a lower portion of the first compartment for receiving paint laden aqueous medium from the water container;
means operable to retain the aqueous medium in the first compartment for a residence time sufficient to permit paint solids to accumulate as a raft on the surface of the aqueous medium in the first compartment; and
means for applying fluid pressure to the raft to cause paint solids to flow through the opening and into the waste container.

25. Apparatus according to claim 24 wherein the last-named means comprises an eductor connected with the second compartment, and a circulating pump for pumping aqueous medium to said eductor for creating negative pressure in said second compartment to draw paint solids through the opening.

26. Apparatus according to claim 24 in which said opening between the compartments comprises a weir, and wherein the means operable to retain the aqueous medium in the vessel comprises isolating valves associated one with an inlet and one with an outlet at the lower portion of the first compartment, said isolating valves being respectively operable to control the admission of paint solids laden aqueous medium to the first compartment and to control the velocity of aqueous medium entering and leaving the first compartment so as to provide in the first compartment said residence time for the aqueous medium in the first compartment, and wherein said means for applying fluid pressure includes control means operable during accumulation of paint solids in the first compartment to maintain in the upper portion of the first compartment and in the second compartment a negative air pressure, the difference between which negative air pressure and atmospheric pressure is sufficient to cause the flow of accumulated paint solids over the weir into said waste container housed in the second compartment.

27. Apparatus according to claim 26, including a level control tank having an inlet connected to the isolating valve associated with the outlet from the lower portion of the first compartment and an outlet, a pipe connected to the isolating valve associated with the inlet at the lower portion of the first compartment and the outlet from which pipe is directed upwards towards the upper portion of the first compartment, and a pump to circulate aqueous medium from the level control tank outlet to a spray booth.

28. Apparatus according to claim 27, including around the outlet end of the pipe an annular perforated tube which is connectable with a source of pressurized air and is arranged to admit into the first compartment a stream of finely dispersed air bubbles to inhibit undue turbulence loss and to assist paint solids flotation from the perimeter regions of the tube.

29. Apparatus according to claim 28, including a reservoir connected to said tube and arranged to contain oil for incorporation in said stream.

* * * * *